April 24, 1945.　　　　　E. M. BELL　　　　　2,374,162
HARVESTING MACHINE
Filed June 23, 1943　　　3 Sheets-Sheet 1
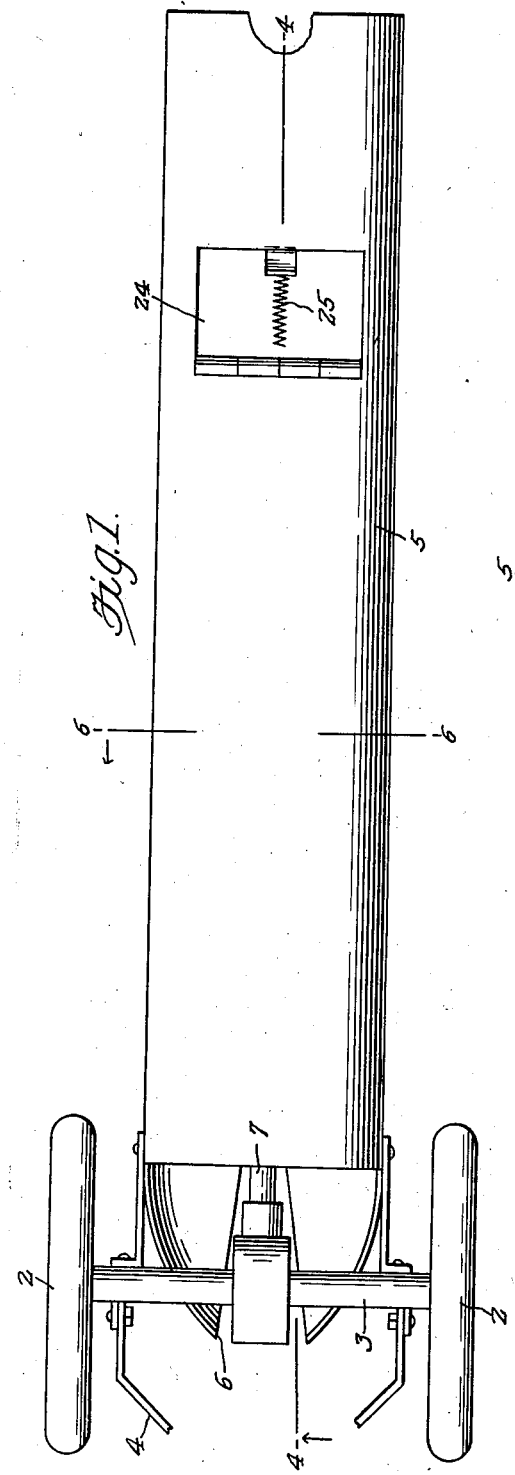
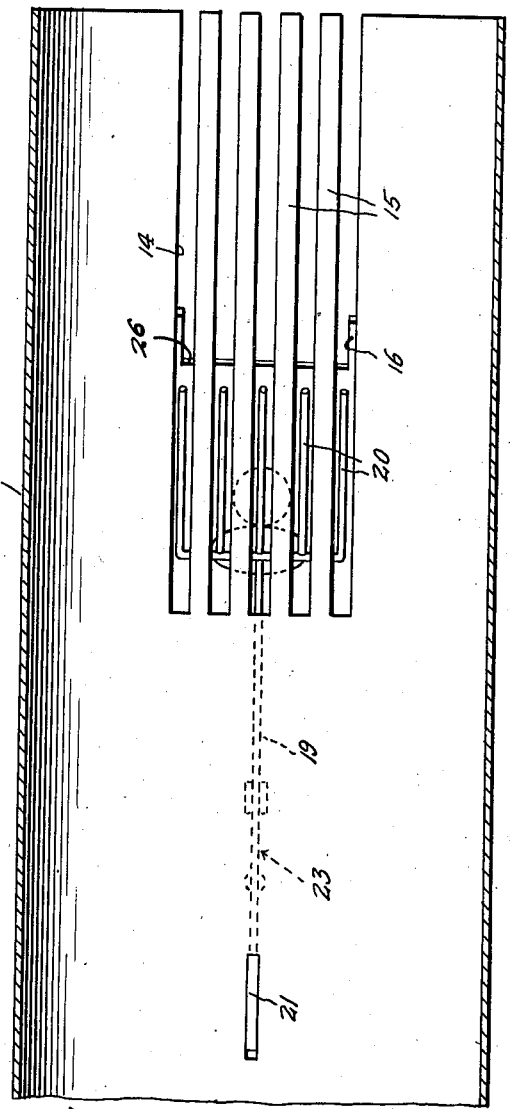
Inventor
Elmer M. Bell
By Clarence A. O'Brien
and Harvey B. Jacobson
Attorneys April 24, 1945.　　　　　E. M. BELL　　　　　2,374,162
HARVESTING MACHINE
Filed June 23, 1943　　　3 Sheets-Sheet 2
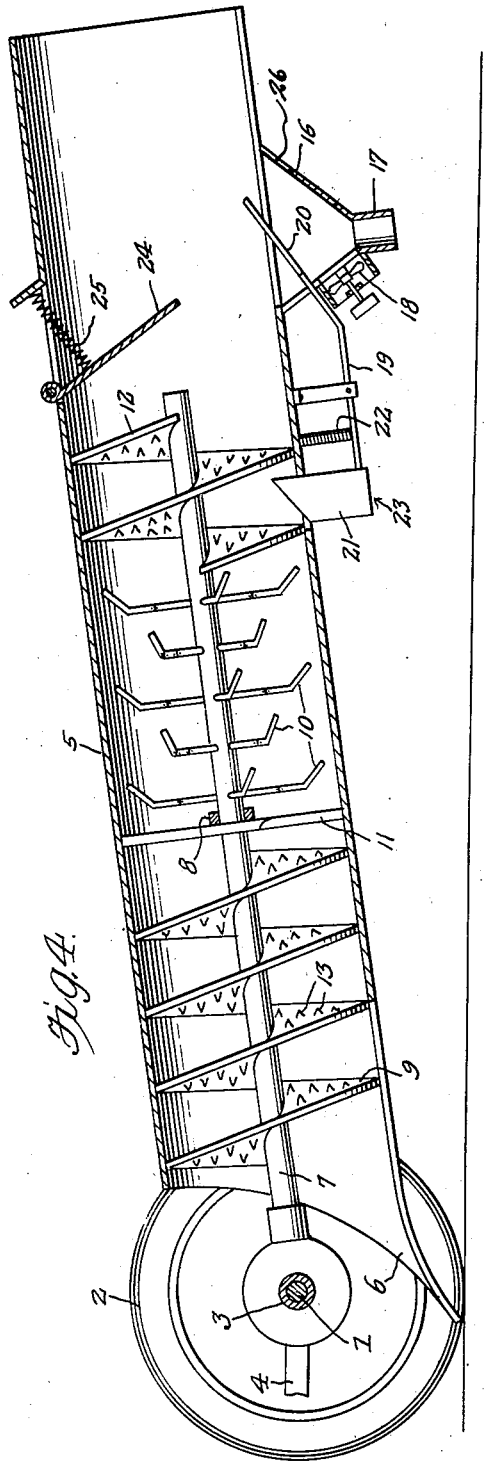
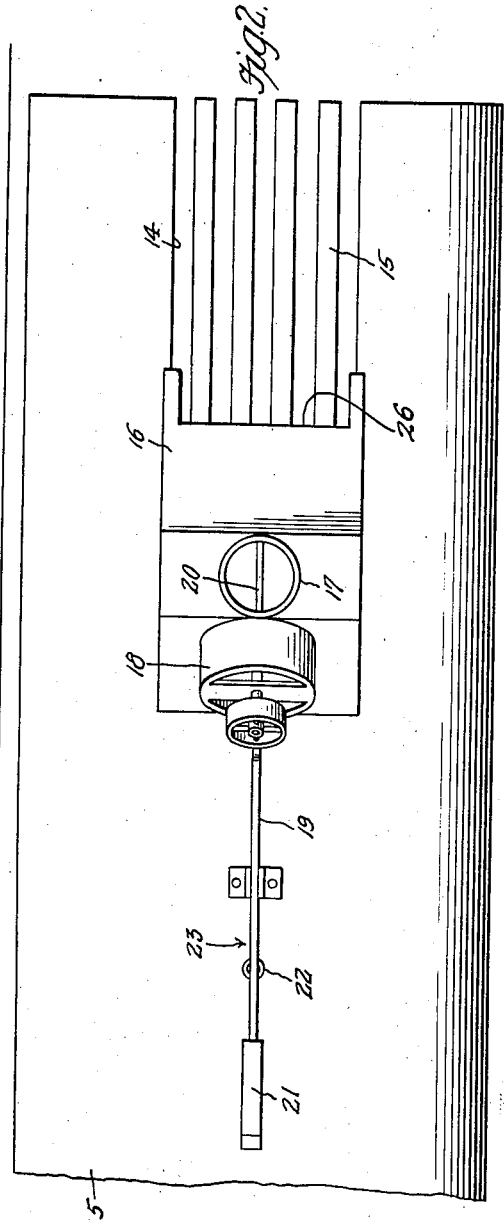
Inventor
*Elmer M. Bell*
By *Clarence A. O'Brien
and Harvey B. Jacobson*
Attorneys April 24, 1945.  E. M. BELL  2,374,162
HARVESTING MACHINE
Filed June 23, 1943  3 Sheets-Sheet 3
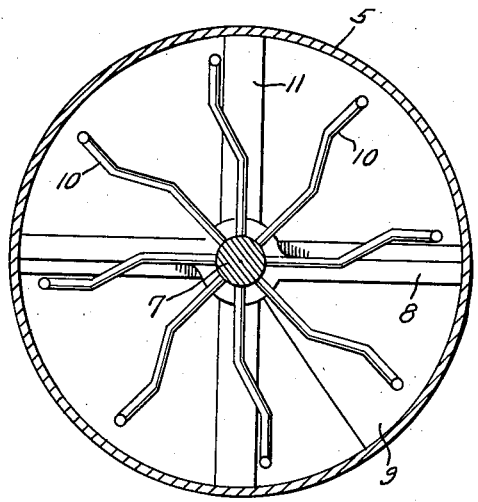
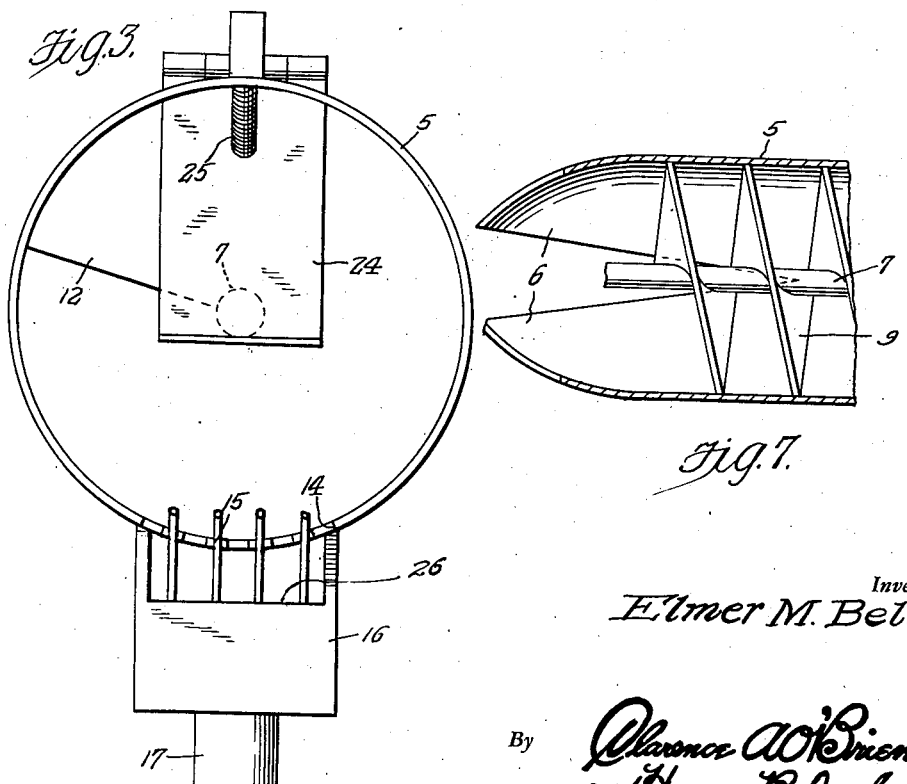
Inventor
Elmer M. Bell
By Clarence A. O'Brien
and Harvey B. Jacobson
Attorneys Patented Apr. 24, 1945

2,374,162

UNITED STATES PATENT OFFICE 2,374,162

HARVESTING MACHINE

Elmer M. Bell, Ajo, Ariz.

Application June 23, 1943, Serial No. 491,987

4 Claims. (Cl. 56—128)

The present invention relates to new and useful improvements in pea and bean harvesters and has for one of its important objects to provide, in a manner as hereinafter set forth, a machine of this character comprising novel means for separating the peas or beans from the hulls and vines.

Other objects of the invention are to provide a pea or bean harvester of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein—

Figure 1 is a top plan view of a harvester constructed in accordance with the present invention, Figure 2 is a view in bottom plan of the rear portion of the device.

Figure 3 is a view in rear elevation of the machine.

Figure 4 is a view in vertical longitudinal section, taken substantially on the line 4—4 of Figure 1.

Figure 5 is a view in horizontal section through the rear portion of the machine.

Figure 6 is a cross sectional view, taken substantially on the line 6—6 of Figure 1.

Figure 7 is a view in horizontal section through the front portion of the machine, looking downwardly.

Referring now to the drawings in detail, it will be seen that the embodiment of the invention which has been illustrated comprises an axle 1 having fixed on its end portions supporting wheels 2. A housing 3 is provided for the axle 1. Suitable draft means 4 is provided on the housing 3.

Also mounted on the housing 3 and extending rearwardly therefrom is an inclined cylinder 5 of suitable length and diameter. Extending forwardly and downwardly from the cylinder 5 is a pair of diverging vine lifters 6. A shaft 7 is mounted centrally in the cylinder 5 and operatively connected by suitable gears to the axle 1 for actuation thereby. The shaft 7 is journaled, at an intermediate point, in a stationary cutter bar 8 which is fixed diametrically in the cylinder 5.

Forwardly of the stationary cutter 8, a worm conveyor 9 is fixed on the shaft 7 for operation in the cylinder 5. Beaters 10 are fixed on the shaft 7 rearwardly of the stationary cutter 8. Also fixed on the shaft 7, between the members 9 and 10, is a rotating cutter 11 which coacts with the stationary cutter 8 for shearing the vines. Another worm conveyor 12 is fixed on the shaft 7 rearwardly of the beaters 10. The worm conveyors 9 and 12 are toothed or roughened, as at 13.

The lower, rear portion of the cylinder 5 has formed therein a longitudinally extending opening 14 in which spaced, parallel bars 15 are provided. Depending from the cylinder 5, below the forward portion of the opening 14, is a hopper 16 from which a discharge neck or tube 17 depends. An upwardly and rearwardly directed blower 18 is mounted in the lower front portion of the hopper 16. The blower 18 may be driven by any suitable conventional means (not shown).

Pivotally mounted, at an intermediate point, below the cylinder 5 forwardly of the hopper 16, is a lever 19. The lever 19 extends into the hopper 16 and is provided, on its rear end, with tines 20 which are operable in the lower portion of the cylinder 5 between the bars 15. An upstanding cam 21 is fixed on the forward end portion of the lever 19 and extends upwardly into the lower portion of the cylinder 5 for engagement and actuation by the worm conveyor 12. A coil spring 22 is connected to the lever 19 for yieldingly urging the cam 21 upwardly. The elements 19 to 22, inclusive, constitute what may be considered a shaker which is designated generally by reference numeral 23.

Hingedly mounted in the upper portion of the cylinder 5 for swinging movement in a vertical plane adjacent the rear end of the worm conveyor 12 is a pressure plate 24. A coil spring 25 yieldingly resists rearward swinging movement of the plate 24.

It is thought that the operation of the machine will be readily apparent from a consideration of the foregoing. Briefly, the machine travels over the ground with the wheels 2 straddling the row to be harvested. The vines are lifted into the forward end portion of the cylinder 5 by the members 6. These vines are severed by the forward end portion of the worm conveyor 13 and moves rearwardly thereby. The toothed or roughened surfaces of the worm conveyor 13 remove the hulls from the peas or beans and the vines are chopped by the coacting cutters 8 and 11. The beaters 10, also the worm conveyor 12, further separate the hulls, vines, and peas or beans, the latter dropping between the bars 15 into the hopper 16. These peas or beans may be sacked by attaching a bag to the discharge neck 17. As the worm conveyor 12 rotates, the shaker 23 is actuated thereby for assisting in separating the peas or beans and causing them to drop into the hopper 16. The blower 18 drives the chaff, hulls, etc., which enter the hopper 16, out through an opening 26 in the rear of said hopper. The plate 24 compresses the vines as they leave the worm conveyor 12 and are forced rearwardly thereby. Handles, wheels, or other suitable means (not shown) may be provided for supporting the rear end of the inclined cylinder 5.

It is believed that the many advantages of a pea or bean harvester constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A harvesting machine comprising a cylinder open at its ends, supporting wheels on one end of the cylinder, vine lifters on said one end of the cylinder, a shaft rotatable longitudinally in the cylinder and operatively connected to the wheels for actuation thereby, worm conveyors fixed on the shaft at longitudinally spaced points, beaters on the shaft between the worm conveyors, vine chopping means in the cylinder between the beaters and the forwardmost worm conveyor, and means rearwardly of the rear worm conveyor for separating peas or beans from the vines.

2. A harvester of the character described comprising an inclined cylinder open at its ends, supporting wheels for the lower end of the cylinder, a shaft operable longitudinally in the cylinder, means operatively connecting said shaft to the wheels for actuation thereby, a worm conveyor fixed on the shaft for rotation in the cylinder, a hopper depending from the cylinder, a lever pivotally mounted beneath the cylinder, tines on one end of the lever and operable in the cylinder for separating peas or beans from the hulls and vines, and a cam on the other end of the lever operable by the worm conveyor for actuating said lever.

3. A harvesting machine of the class described comprising a longitudinal inclined cylinder open at its ends, supporting wheels for the forward end of the cylinder, a shaft rotatable longitudinally in the cylinder and operatively connected to the wheels for actuation thereby, a worm conveyor fixed on the shaft, the cylinder having a longitudinally elongated opening in its lower portion rearwardly of the worm conveyor, a discharge hopper depending from the cylinder beneath the forward portion of the opening, and a shaker operable in the cylinder through the opening, said shaker including a cam operable by the worm conveyor for actuating said shaker.

4. A harvesting machine of the character described comprising a housing, an axle journaled in the housing, supporting wheels fixed on said axle, a longitudinal inclined cylinder having its forward end mounted on the housing, said cylinder open at its ends, a longitudinal shaft in the cylinder operatively connected to the axle for actuation thereby, said cylinder for the reception of pea and bean vines, lifters on the forward end of the cylinder for directing the vines thereinto, worm conveyors fixed on the shaft at longitudinally spaced points, beating and chopping means on the shaft between the worm conveyors, means in the cylinder cooperable with the rear worm conveyor for compressing the vines, and a shaker in the cylinder operable by said rear worm conveyor for separating the peas from the hulls and vines.

ELMER M. BELL.